United States Patent
Alonso et al.

(10) Patent No.: US 10,176,265 B2
(45) Date of Patent: Jan. 8, 2019

(54) AWARENESS ENGINE

(71) Applicant: Microsoft Technology Licensing, LLC, Redmond, WA (US)

(72) Inventors: Omar Alonso, Redwood Shores, CA (US); Jake Hofman, New York, NY (US); Vasileios Kandylas, Sunnyvale, CA (US); Siddhartha Sen, New York, NY (US); Serge-Eric Tremblay, San Jose, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 309 days.

(21) Appl. No.: 15/077,933

(22) Filed: Mar. 23, 2016

(65) Prior Publication Data

US 2017/0277790 A1 Sep. 28, 2017

(51) Int. Cl.
*G06F 17/30* (2006.01)
*H04L 29/08* (2006.01)

(52) U.S. Cl.
CPC .... *G06F 17/30867* (2013.01); *G06F 17/3053* (2013.01); *G06F 17/30554* (2013.01); *G06F 17/30864* (2013.01); *H04L 67/02* (2013.01); *H04L 67/22* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 8,010,657 B2 | 8/2011 | Hall et al. | |
| 8,204,977 B1 | 6/2012 | Brodersen et al. | |
| 8,239,397 B2 | 8/2012 | Stefik et al. | |
| 8,332,512 B1 * | 12/2012 | Wu | G06Q 30/0254 |
| | | | 705/319 |
| 8,646,073 B2 | 2/2014 | Raviv | |

(Continued)

FOREIGN PATENT DOCUMENTS

| | | |
|---|---|---|
| WO | 2011148222 A1 | 12/2011 |
| WO | 2014159540 A1 | 10/2014 |

OTHER PUBLICATIONS

Neidlinger, Julie, "Trending Topics on Twitter", Published on: Apr. 9, 2012 Available at: http://todaymade.com/blog/leveraging-trending-topics-for-social-media-success/.

(Continued)

*Primary Examiner* — Hung D Le
(74) *Attorney, Agent, or Firm* — Law Offices of Richard Chi; Richard Chi

(57) ABSTRACT

Techniques for designing an awareness engine that organizes and serves popularly discussed and viral online content in response to user search queries. In an aspect, quality online content is identified by analyzing posts by users of a social network over specific time periods. For each item of quality online content identified, a virality score is calculated, and a social signature is constructed. The social signature can be constructed from the content itself, as well as from posts referencing the content. Based on this processing, relevant quality online content having the highest virality scores may be retrieved and served in response to user queries. Further techniques are provided for designing a user interface for the awareness engine.

18 Claims, 13 Drawing Sheets

(56) References Cited

U.S. PATENT DOCUMENTS

| | | | |
|---|---|---|---|
| 8,806,000 | B1 | 8/2014 | Wattenhofer et al. |
| 9,009,126 | B2 | 4/2015 | Spivack et al. |
| 9,031,888 | B2 | 5/2015 | Lawrence et al. |
| 9,183,259 | B1 | 11/2015 | Marra et al. |
| 9,323,850 | B1* | 4/2016 | Lewis ................ G06F 17/30867 |
| 9,413,834 | B2* | 8/2016 | Rao ........................ H04L 67/22 |
| 2009/0048904 | A1 | 2/2009 | Newton et al. |
| 2012/0166428 | A1* | 6/2012 | Kakade ............ G06F 17/30873 707/723 |
| 2012/0239489 | A1 | 9/2012 | Peretti et al. |
| 2014/0237093 | A1 | 8/2014 | Hofman et al. |
| 2014/0280011 | A1* | 9/2014 | Zhou ................... G06F 17/3053 707/709 |
| 2014/0280052 | A1 | 9/2014 | Alonso et al. |
| 2014/0281874 | A1 | 9/2014 | Hofman et al. |
| 2014/0317184 | A1* | 10/2014 | Weaver .................. H04L 67/22 709/204 |
| 2014/0344281 | A1* | 11/2014 | Rao ........................ H04L 67/22 707/741 |
| 2014/0358911 | A1 | 12/2014 | McCarthy et al. |
| 2015/0067849 | A1 | 3/2015 | Agrawal et al. |
| 2015/0120717 | A1 | 4/2015 | Kim et al. |
| 2016/0170990 | A1* | 6/2016 | Walters ............... G06F 17/3053 707/735 |
| 2016/0364492 | A1* | 12/2016 | Thomas ............ G06F 17/30867 |

OTHER PUBLICATIONS

Berger, et al., What Makes online Content Viral?, In Journal of Marketing Research, vol. 49, No. 2, Apr. 2012, 17 pages.

Goel, et al., "The Structural Virality of Online Diffusion", In Journal of Management Science, Jul. 22, 2015, pp. 1-32.

Alonso, et al., "The World Conversation: Web Page Metadata Generation from Social Sources", In Proceedings of the 24th International Conference on World Wide Web, May 18, 2015, pp. 385-395.

Goel, et al., "The Structural Virality of Online Diffusion", In Journal of Management Science, vol. 62, Issue 1, Jul. 22, 2015, pp. 180-196.

Hoang, et al., "Virality and Susceptibility in Information Diffusions", In Proceedings of the Sixth International AAAI Conference on Weblogs and Social Media, May 20, 2012, pp. 146-153.

"International Search Report and Written opinion Issued in PCT Application No. PCT/US2017/022852", dated May 2, 2017, 12 Pages.

* cited by examiner

1130  2014-10-15  Search

940

Hurricane Hugo devastates Florida
Reuters.com

@User8199
HurricaneHugo was the biggest
disaster in history! https://hu.rr/cain @User4441
I'm praying for the victims...
http://lo.za.cxdf @User8095
We need donations and volunteers
for the aftermath of #HurricaneHugo
https://sx.sw/cvvc

950

Major storm warning issued for
Midwest weather.com

@User1239
PerfectStorm is going to hit soon!
https://st.ro/mnby

@User2138
Big storm coming! #Staysafe
https://lk.ej/ikhg

@User3311
Got the food, water, and generator
ready to go... https://kc.gr/miap

1160 — Hashtags  1162  1169

| Hashtags | Keywords |
|---|---|
| #Twibbon | rolling out |
| #DriftSpirits | mechanics |
| #news | test |
| #WFC2015 | passwords |
| #EquinoxCelebrations | favorites |
| #Portugal | operation |
| #EU | something |
| #giveaway | Gizmo |
| #bbcf1 | Bloomberg |
| #HurricaneHugo | Hurricane Hugo |
| #QT | QT |

AWARENESS ENGINE

BACKGROUND

Search engines are an indispensable tool for organizing and presenting content found on the World Wide Web. Search engines apply algorithms to evaluate and rank web pages based on their relevance to a specific user query. While such algorithms typically consider web page content and links to other web pages, they may not take into account what topics are being discussed in social media, e.g., the subsets of the entire World Wide Web that are receiving a great deal of attention from users at any given time.

Popularity and virality are two metrics used to quantify the level of user interest in any given online content. Popularity measures how many people consume or share a web page, while virality measures how content spreads amongst users of a social network over a given period of time. It would be advantageous for a search engine to be "aware" of a given content's popularity and virality when serving results to user queries. It would also be advantageous to archive such content by date to provide a historical perspective on what has been perceived as important in the past. It would further be advantageous to provide an intuitive and powerful interface allowing the user to refine search results, retrieve, and browse content that the user should be aware of.

Accordingly, it would be desirable to provide techniques for designing a temporally aware search engine or "awareness engine" that efficiently organizes online content by popularity and virality, and effectively serves such content in response to user queries.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, techniques are disclosed for identifying content popularly shared and discussed amongst users of a social network over a specified time period. For identified content meeting a given quality threshold, virality and popularity scores are calculated, quantifying the extent to which such quality content is both "viral" and widespread. Social signatures are further extracted and associated with the identified quality content.

In an aspect, an awareness engine serves the identified quality content in response to user search queries, e.g., by matching or otherwise correlating user search queries with social signatures over the specified time periods, and ranking the content by order of virality score, popularity score, or a combination thereof. The awareness engine may provide options for the user to navigate to related viral links, posts, and content via an intuitive user interface.

In a further aspect, the awareness engine can also display quality content in the absence of user search queries, e.g., by automatically showing top viral and/or popular content on a landing page of the awareness engine corresponding to a default time period.

Other advantages may become apparent from the following detailed description and drawings.

BRIEF DESCRIPTION OF THE DRAWINGS

FIG. 11 illustrates an alternative exemplary embodiment of a user interface for an awareness engine.

DETAILED DESCRIPTION

Various aspects of the technology described herein are generally directed towards techniques for designing a search engine for online content based on virality metrics.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
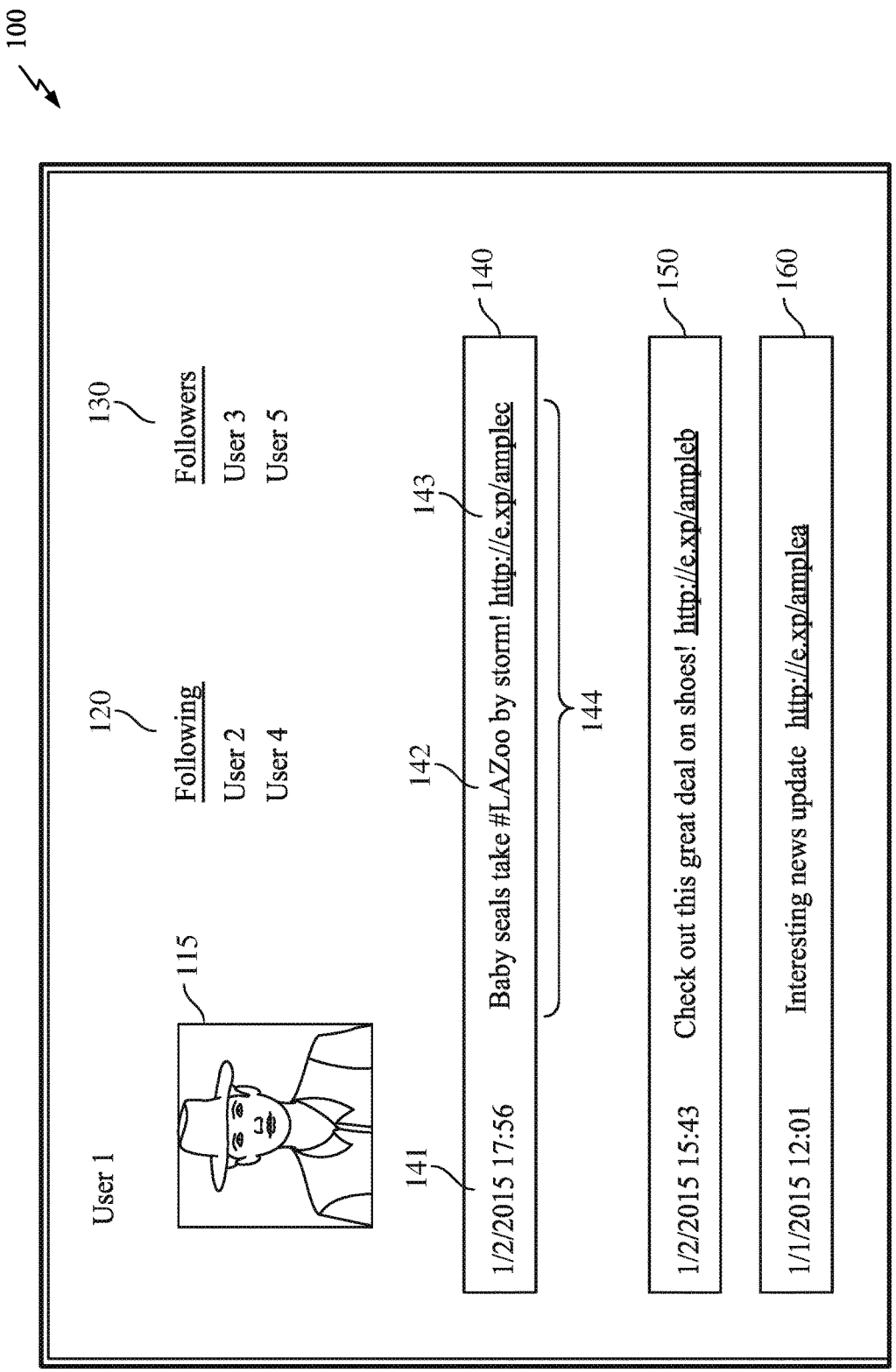
FIG. 1 illustrates an exemplary user profile as may be typically associated with a user of a social network application.

FIG. 1 illustrates an exemplary user profile 100 as may be typically associated with a user of a social network platform or application. Note FIG. 1 is shown for illustrative purposes only, and is not meant to limit the scope of the present disclosure to any particular implementations, e.g., profile formats or contents shown, or any particular types of social networks. The scope of the present disclosure will be understood to encompass any online content for which corresponding virality and/or popularity scores may be computed.

In FIG. 1, profile 100 may be associated with a user denoted User 1. Profile 100 may include a profile picture 115 uploaded by User 1 and/or other biographical information (not shown). User 1 may follow profiles of other users (e.g., User 2 and User 4) as indicated by "Following" list 120, and User 1 may be followed by other users (e.g., User 3 and User 5) as indicated by "Followers" list 130. In particular, whenever any user updates his or her profile, or otherwise originates specific posts, then followers of that user may be notified by the social network application. In this Specification and in the claims, a "friend" of a user may denote someone that user is following. For example, User 1's friends include User 2 and User 4.

FIG. 1 further shows a plurality of posts 140, 150, and 160 created by User 1. Each post may describe a noteworthy item to be shared with friends. Note post 140 is shown for illustrative purposes only, and is not meant to limit the scope of the present disclosure to only posts containing all the fields shown.

In particular, post 140 is associated with a time stamp 141, and includes comment portion 144 corresponding to text composed by User 1 to describe a noteworthy item. Comment portion 144 may include one or more hashtags 142, which may be a text descriptor chosen by User 1 to mark keywords and topics associated with the item. It will be appreciated that hashtags may facilitate the location and identification by other users of related content, e.g., by enabling other users to click on or search for posts marked by the same hashtag. Hashtags may generally include a text descriptor prefixed by the "#" symbol (e.g., "#LAZoo" in post 140).

Comment portion 144 may further include a link 143 corresponding to an online (or "Web") address, e.g., in Uniform Resource Indicator (URI) or Uniform Resource Locator (URL) format, linking to specific online content provided within or outside the social network application, e.g., web pages, videos, or other types of media. In some cases, a full-length URI or URL may be abbreviated or shortened into an "abbreviated" form (also denoted "abbreviated URI" or "abbreviated URL" herein) for convenience and ease of display. Note while illustrative instances of online addresses expressed as URL's are described hereinbelow, they are not meant to limit the scope of the present disclosure to online addresses expressed only as URL's, URI's, or any other format.

Note while illustrative exemplary embodiments may refer herein to "posts" containing links to online content, the techniques of the present disclosure are generally applicable to any types of communications between users of a social network. For example, such communications may include e-mails, private messages, text messages, instant messages, etc., containing comments on and/or links to specified online content, wherein such communications may further be communicated to other users on the social network. Such alternative exemplary embodiments are contemplated to be within the scope of the present disclosure.

Note profile 100 is described for illustrative purposes only. It will be appreciated that the techniques for identifying and ranking viral content described hereinbelow need not be restricted to only social network applications wherein users maintain profile pages and/or post to such profile pages. In alternative exemplary embodiments, any software application allowing users to communicate with each other to share content may utilize the techniques of the present disclosure. For example, any communications platform enabling users to send and receive messages that allows commenting and sharing of links to online content may benefit from the techniques of the present disclosure. Furthermore, virality and/or popularity scores (as further described hereinbelow) for specific content may be calculated by accessing sender/receiver fields of messages, if available, or otherwise from records of address books or contacts lists, etc. Such alternative exemplary embodiments are contemplated to be within the scope of the present disclosure.

Figure 2:
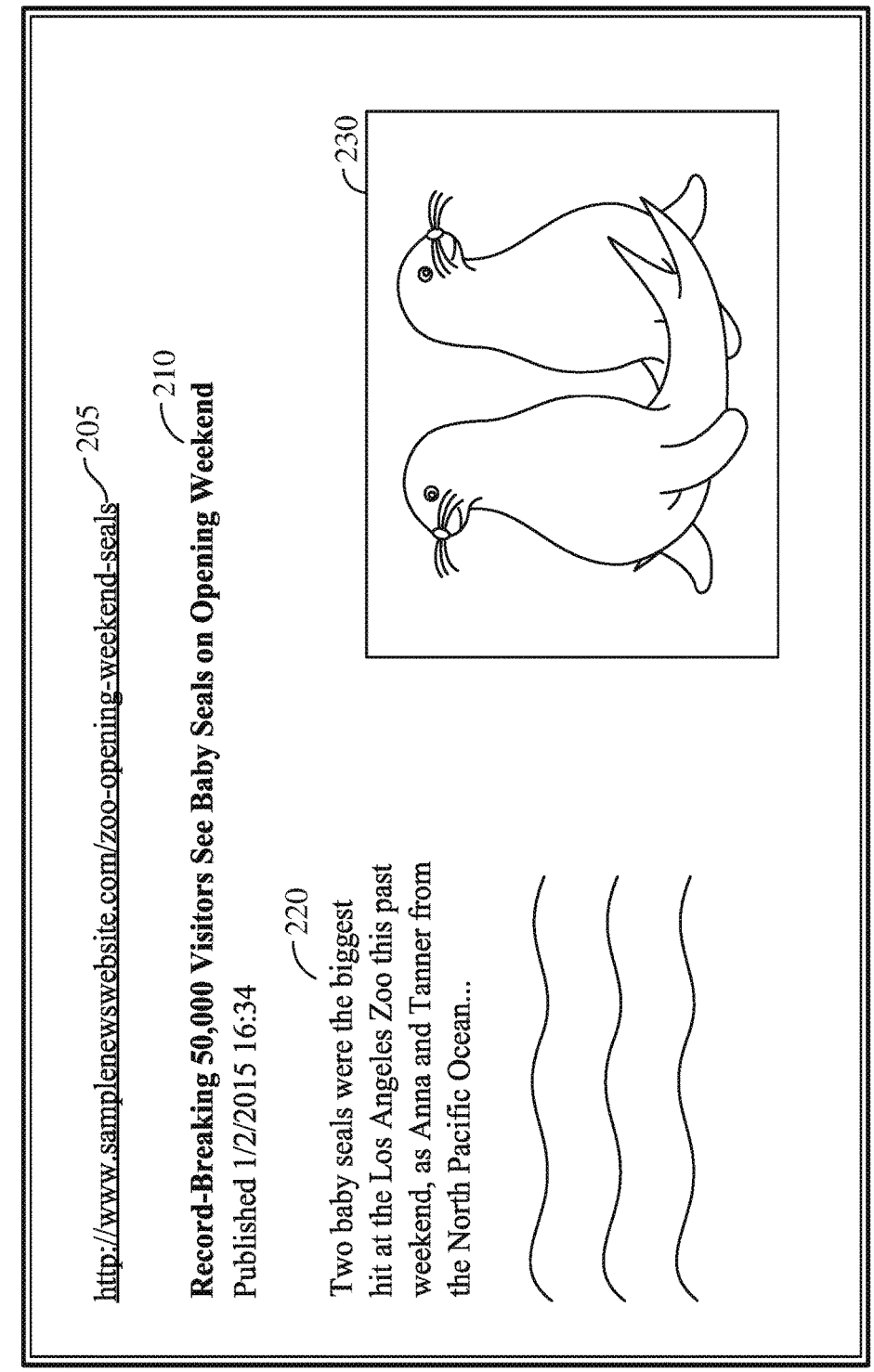
FIG. 2 illustrates an exemplary news web page referred to by a link in a user post.

FIG. 2 illustrates an exemplary news web page 200 referred to by link 143 in post 140. Note FIG. 2 is shown for illustrative purposes only, and is not meant to limit the scope of links to any specific type of content or media shown. In this Specification and in the Claims, content such as news web page 200, to which one or more users link or otherwise reference in their posted posts, may be referred to as "online content."

In FIG. 2, news web page 200, describing the exemplary topic of seals at the LA Zoo, includes fields such as a URL address 205, headline 210, descriptive text 220, and one or more descriptive images 230. Note URL link 143 in post 140 may be an abbreviated version of the full-length URL 205. In an exemplary embodiment, certain portions of a social signature may be extracted from the fields of the online content shown, as further described hereinbelow.

Figure 3:
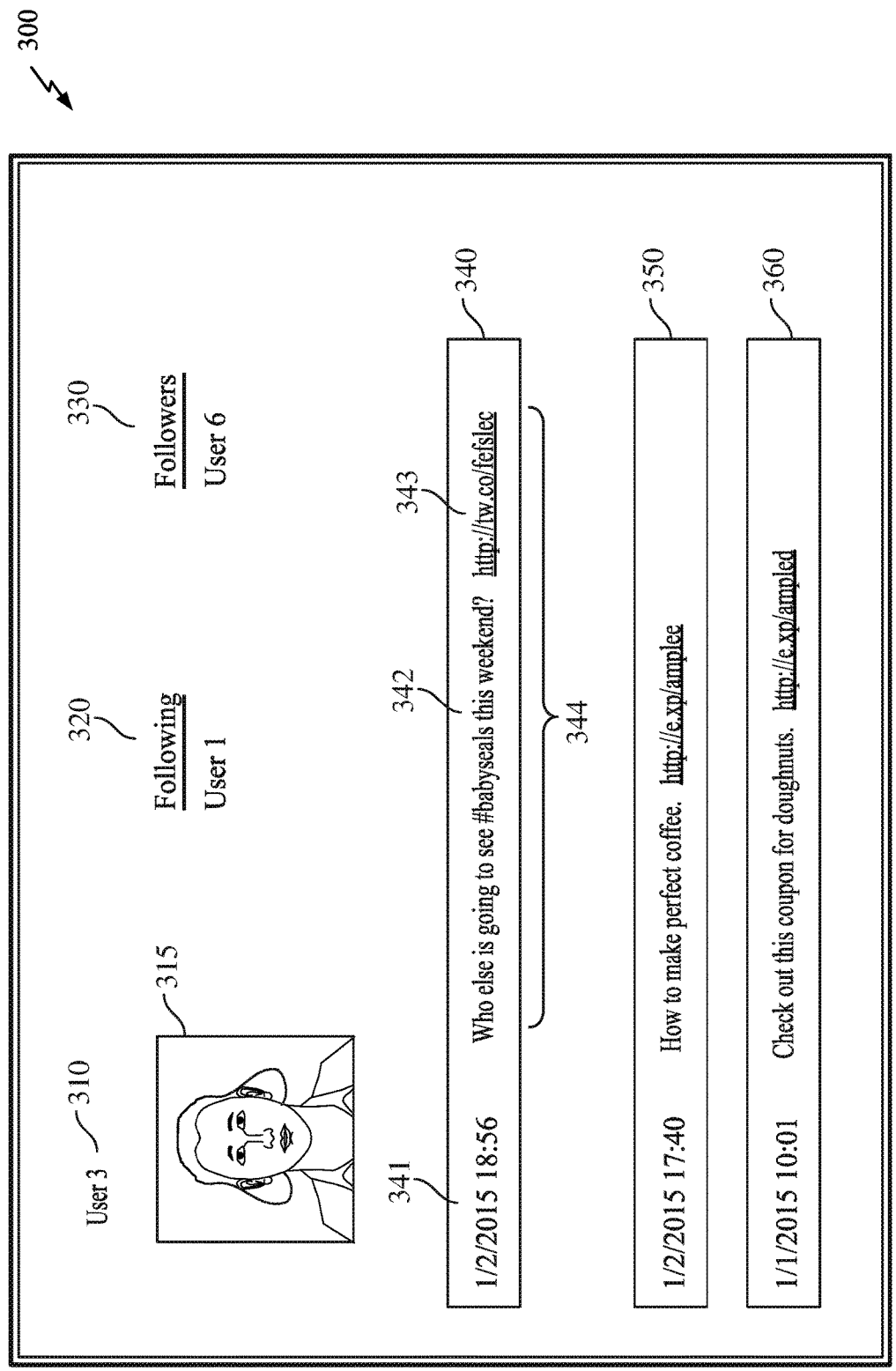
FIG. 3 illustrates an exemplary profile associated with a follower of User 1.

From seeing post 140 on User 1's profile 100, or otherwise learning about online content 200 from User 1, one or more of User 1's followers may wish to share the same online content on his or her own profile. FIG. 3 illustrates an exemplary profile 300 associated with such a follower of User 1. In particular, User 3 (corresponding to the same User 3 identified in Followers list 130 of FIG. 1) follows User 1, while also maintaining her own user profile 300. User 3 creates posts 340, 350, 360, of which post 340 is related to User 1's post 140.

In particular, abbreviated URL 343 of post 340 is assumed to link to the same online content, i.e., news web page 200, as abbreviated URL 143 of post 140. As also shown in FIG. 3, User 3 writes her own comments 344 and hashtag 342 relating to URL 343.

As further described hereinbelow, in an exemplary embodiment, derivation of online content 200 by User 3 from User 1's profile may be inferred from several objective factors, e.g., User 3 is a follower of User 1 as indicated by "Followers" column 130 in FIG. 1, and/or time stamp 341 of post 340 by User 3 post-dates time stamp 141 of post 140 by User 1. Accordingly, for any given online content, inferences regarding the directionality of the spread of information, e.g., who received selected information from whom, may be made across all users of a social network application in such a manner to determine the particular user relationships through which a given online content is spread throughout the network.

In an aspect, such relationships may be encapsulated in a diagram known as a "tree diagram." In a social network application supporting a large number of interconnected users, a tree diagram having a large number of nodes and branches may accordingly be constructed for any given online content.

Figure 4:
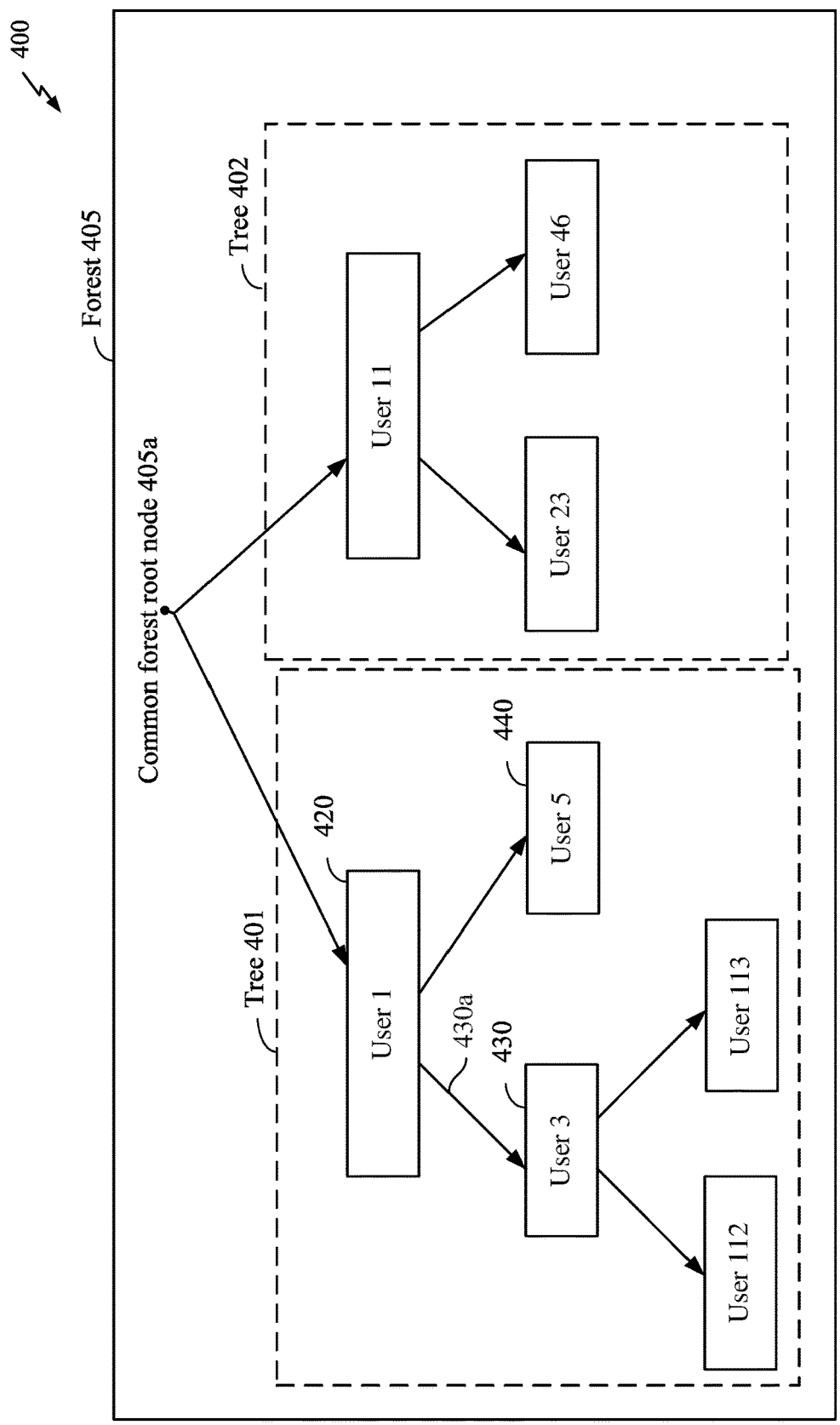
FIG. 4 illustrates an example of a tree diagram.

FIG. 4 illustrates an example of a tree diagram 400. In FIG. 4, tree diagram 400 shows the relationships amongst all adopters of a particular instance or "item" of online content, such as news web page 200 of FIG. 2. An "adopter" is a user on the social network who posts a link to a particular item, or otherwise communicates that item to other users. For example, each of the plurality of nodes 420, 430, 440 represents an "adopter."

In FIG. 4, a unidirectional arrow connecting two adopters signifies that the adopter at the destination of the arrow received knowledge of the online content from the adopter at the origin of the arrow. Such a relationship between two adopters is also denoted herein as an "adoption relationship." Note an "original" adopter may refer to a user who has direct knowledge of the online content (e.g., not having received such knowledge from another user), and may be represented by a node that is not the destination of any arrow. For example, User 1 and User 11 are original adopters of the given online content.

Note adopter 420 is illustratively shown to be the same User 1 earlier described hereinabove with reference to profile 100 in FIG. 1. Adopter 430, corresponding to the same User 3 described with reference to profile 300 in FIG. 3, is further shown as having received information about an item of online content (such as news web page 200) from adopter 420, and this is represented by arrow 430*a*.

Note the set of all nodes and connections emanating from a single original adopter may be denoted herein as a "diffusion tree" or "tree," examples of which are tree 401 and tree 402 in FIG. 4. The set of all diffusion trees for a given item of online content may be denoted as a "forest," e.g., forest 405 in FIG. 4. All diffusion trees of a forest are connected via a common forest rood node, e.g., node 405*a* for forest 405 in FIG. 4.

It will be appreciated that a tree diagram offers a useful way to visualize certain parameters characterizing the spread of online content amongst users. For example, in certain exemplary embodiments, the popularity of an item can be measured as the total number of adopters in the forest associated with that content.

The virality of an item may also be defined using the tree diagram. In general, virality may correspond to any metric that is based on the structure of the tree or forest, including its nodes and "edges" (e.g., represented by arrows in FIG. 4). In an exemplary embodiment, virality may be measured using the average pairwise distance between all pairs of adopters in the forest associated an item. Alternatively, or in conjunction with average pairwise distance, virality may include other parameters, such as a fraction corresponding to the largest number of child nodes of a single parent node divided by the total number of the nodes in the forest or the tree, a probability that two random nodes have a distinct parent node, an average depth of the nodes, and/or time averaging, window averaging, filtering, and/or other suitable operations performed on such parameters.

Traditional Internet search engines may consider certain aspects of a web page when identifying and ranking web pages most relevant to a user search query, e.g., the title, the presence of anchor text and/or certain keywords or links in the web page, whether other web pages link to that web page, etc. To more accurately capture relevance, however, it would also be beneficial to consider the popularity and virality of online content. Accordingly, it would be desirable to design an "awareness" search engine (also denoted "awareness engine" herein) that leverages metrics available from messages and/or postings on social networks to identify and serve the most relevant and timely online content.

Figure 5:
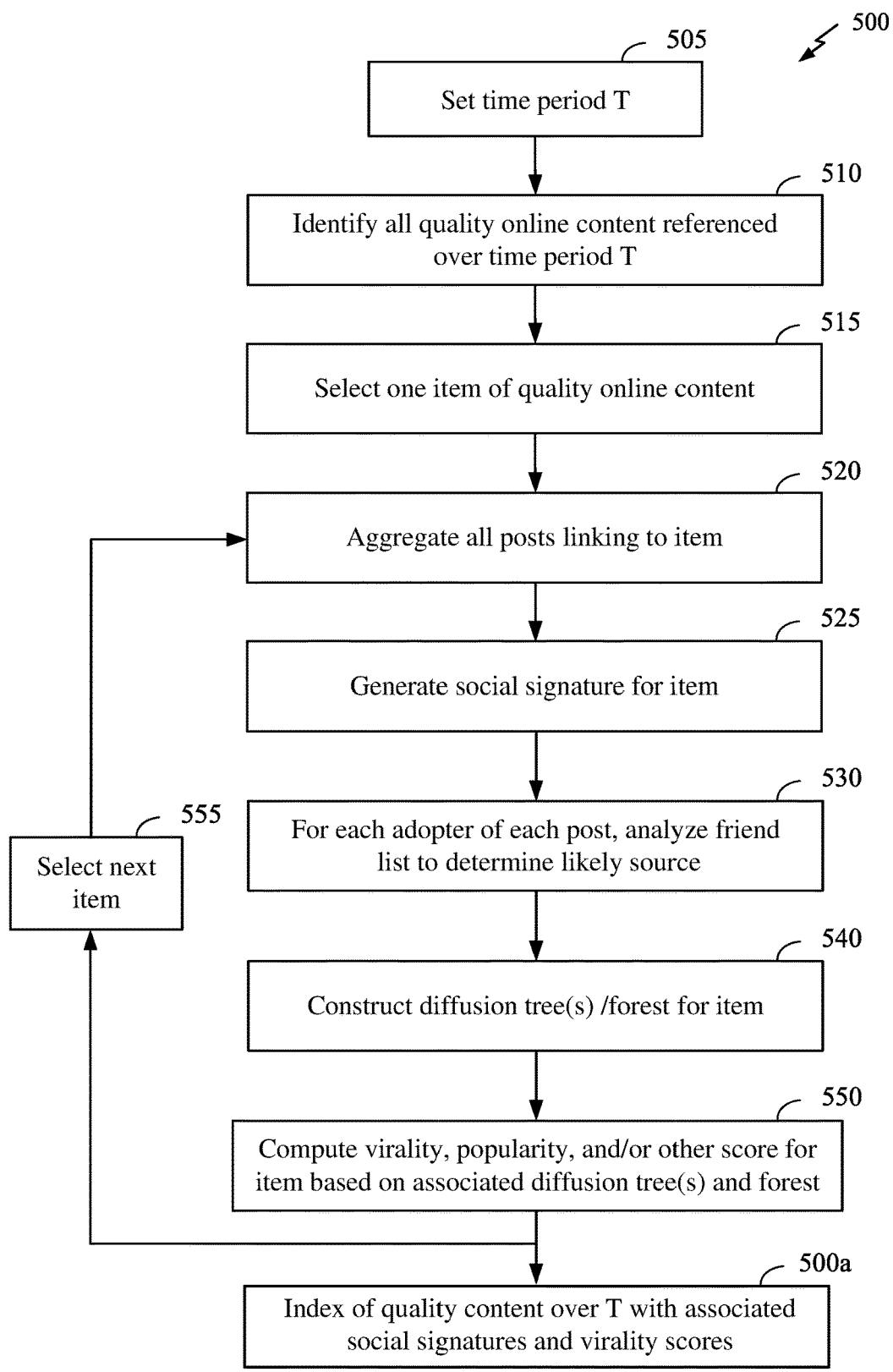
FIG. 5 illustrates an exemplary embodiment of a method for identifying and organizing viral content from user communications on a social network.

FIG. 5 illustrates an exemplary embodiment of a method 500 for identifying and organizing viral and/or popular content. Method 500 may be implemented using, e.g., a computer system capable of accessing and identifying interrelationships between users of a social network, as well as communications generated by users such as comments and posts. Note FIG. 5 is shown for illustrative purposes only, and is not meant to limit the scope of the present disclosure to any particular method shown.

While the description hereinbelow may illustratively refer to operations being performed over all "posts" by users, it will be understood that any communications between users (including posts, private messages, emails, etc.) may generally be accommodated using the techniques described. Such alternative exemplary embodiments are contemplated to be within the scope of the present disclosure.

In FIG. 5, at block 505, a time period T is chosen, over which popularity and/or virality of online content is to be assessed.

In an exemplary embodiment, T may be specified by a user. Alternatively, or in conjunction therewith, T may be specified by design parameters. For example, in the absence of explicit input by the user, T may be set to a preconfigured duration, e.g., one week or one month. T may also be dynamically configured based on various factors, e.g., longer or shorter depending on query topic or subject. Such alternative exemplary embodiments are contemplated to be within the scope of the present disclosure.

At block 510, the computer system identifies all online content referenced by users of a social network meeting a certain quality threshold, or "quality content," over the selected time period T. In an exemplary embodiment, online content may include content external to the social network, e.g., news web page 200 in FIG. 2, and/or content internal to the social network, e.g., other users' profiles or posts. An exemplary embodiment of further operations performed at block 510 to assess content quality over a given time period is described hereinbelow with reference to FIG. 6.

At block 515, one item of the quality content identified at block 510 is selected.

At block 520, all posts or user communications linking to the selected item are aggregated. Note when abbreviated URL's are used, it may be determined that a plurality of syntactically different URL's may all point to the same item, in which case all such URL's may be aggregated at block 520.

At block 525, a social signature for the item is generated. A social signature may correspond to a list of top words, n-grams, or hashtags capturing the most salient and descriptive terms relating to the item.

In an exemplary embodiment, the social signature may be generated from the online content itself, e.g., keywords extracted from the title or text of the selected item, or the social signature may include text extracted from comments in posts linking to the item. An exemplary embodiment of further operations performed at block 525 to generate a social signature is described hereinbelow with reference to FIG. 7.

For example, for news web page 200, the terms "Anna" and "Tanner" may be extracted from the descriptive text 220 present in the original article itself. Furthermore, "#babyseals," "baby seals," and "#LAZoo" may be extracted from, e.g., the text of comments 144, 344, respectively, of user posts 140, 340 linking to news web page 200. In this instance, an exemplary social signature for the item may be represented as follows: {Anna, Tanner, #babyseals, baby seals, #LAZoo}. Note the present example is given herein for illustrative purposes only, and is not meant to limit the scope of the present disclosure to any particular social signature formats, lengths, content, etc.

At block 530, for each post or communication linking to the selected item, a Following list or other contact list of the adopter is analyzed (or "crawled") to determine how that adopter likely became aware of the item. As described hereinabove, several objective factors may be utilized to infer the relationships between adopters, e.g., by analyzing a Following list of the adopter, or by identifying the friend who most recently posted the same content prior to the adopter, or by analyzing explicit source attribution information if available, etc. It will be appreciated that alternative exemplary embodiments may utilize other techniques for inferring the relationships between users regarding the source of a given item, and such alternative exemplary embodiments are contemplated to be within the scope of the present disclosure.

At block 540, given the adoption relationships derived at block 530, a diffusion tree or forest (e.g., containing many diffusion trees) may be constructed for the item. For example, the forest for online content news web page 200 is illustratively shown in tree diagram 400 of FIG. 4.

At block 550, virality score, popularity score, and/or other score is computed for the item based on the constructed diffusion tree or forest. In an exemplary embodiment, virality score may be computed as the average pairwise distance between all pairs of adopters in the forest associated with that item. In alternative exemplary embodiments, virality score and popularity score may be computed using any other techniques, such as explicitly described hereinabove, or otherwise derivable in view of the present disclosure.

In an exemplary embodiment, an "other score" computed at block 550 may include a composite weighted combination of virality score, popularity score, and/or other considerations. For example, one such "other score" may include virality and popularity. In an exemplary embodiment, the relative weighting of virality versus popularity may be adjusted by the user, or by system configuration. In another exemplary embodiment, a composite score may include virality and popularity, and further include a weighting factor that weights more recent posts or items more heavily. Such alternative exemplary embodiments are contemplated to be within the scope of the present disclosure.

At block 555, a next item to be analyzed is selected. Per block 555, blocks 520-550 are repeated for the next selected content.

While blocks 520-550 are illustratively described hereinabove in a certain sequence (e.g., one block after another), it will be appreciated that implementation of any blocks described herein may generally proceed in a sequence different from that explicitly shown, or in parallel, where appropriate. For example, social signature generation at block 525 may proceed in parallel with construction of the diffusion tree at block 540, etc. Furthermore, blocks 520-550 may be run in parallel across multiple items of quality content. Such alternative exemplary embodiments are contemplated to be within the scope of the present disclosure.

By executing the blocks described hereinabove, it will be appreciated that method 500 generates an index 500a of all quality content identified over a time period T, and associate, e.g., a social signature, vitality score, popularity score, or other score with each item of content identified. In an exemplary embodiment, index 500a enables retrieval of items of quality online content by specifying a particular social signature, e.g., all quality online content related to "baby seals," etc.

In alternative exemplary embodiments, index 500a may further be indexed based on other factors besides social signatures, e.g., quality content can also be indexed by hashtags, any n-grams (not just social signatures), user accounts, etc. For example, searching for #seals (hashtag) or "seals zoo" (n-gram) could return the same link to seals. It will be appreciated that while social signatures may contain very characteristic or distinctive n-grams describing the link, other n-grams could be used as well. Such alternative exemplary embodiments are contemplated to be within the scope of the present disclosure.

Figure 6:
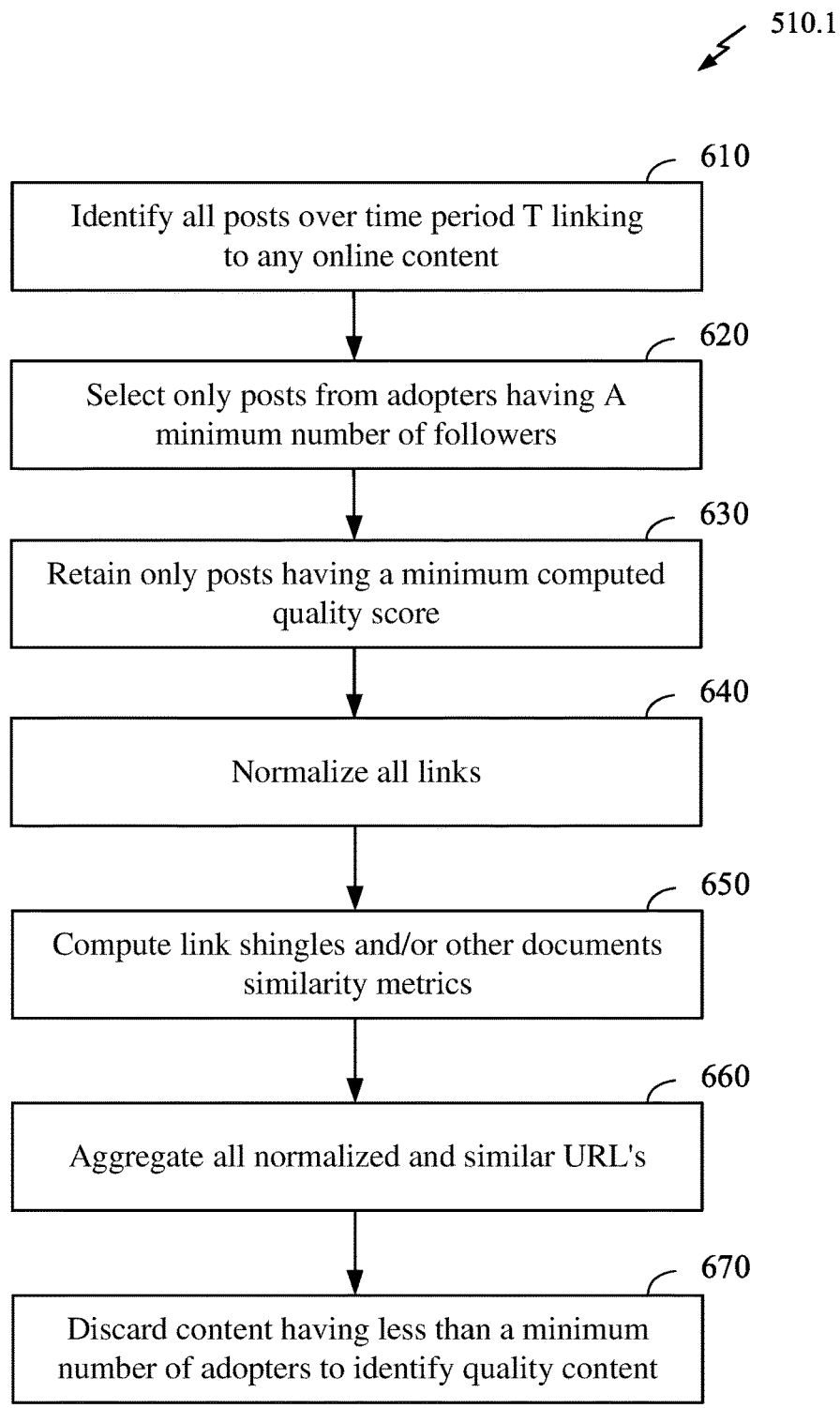
FIG. 6 illustrates an exemplary embodiment of block 510 for identifying quality online content over a selected time period.

FIG. 6 illustrates an exemplary embodiment 510.1 of block 510 for identifying quality online content over a selected time period. Note FIG. 6 is shown for illustrative purposes only, and is not meant to limit the scope of the present disclosure to any particular implementation of block 510, or any particular techniques for filtering posts or content for quality.

In FIG. 6, at block 610, all posts on the social network linking to any online content over a specified time period T are identified. In an exemplary embodiment, a timestamp associated with each post may determine whether it is within specified time period, e.g., timestamp 141 associated with post 140 on profile 100.

At block 620, only posts from adopters having a minimum number of followers are selected for further processing.

At block 630, only posts further having a computed quality score greater than or equal to a minimum score are retained.

In an exemplary embodiment, an exemplary quality score may be computed as described hereinbelow. Note the exemplary quality score is given for illustrative purposes only, and is not meant to limit the scope of the present disclosure to any particular techniques for quality score computation. Any or all of the features listed below may be omitted or combined with other features not explicitly described hereinbelow. Furthermore, alternative techniques to assess the quality of any post, comment, or online content may readily be derived in view of the present disclosure, and such alternative exemplary embodiments are contemplated to be within the scope of the present disclosure.

In particular, a quality score for a post may be computed by deriving a linear or non-linear or other weighted combination of a number of textual features, including, but not limited to, length of a post (or "post length") in characters, post length in characters after removing any instances of "@user" from the comment text, a follower score such as follower count of the post's author, number of mentions (or how many times the author of the post has been mentioned in other posts as surmised from the "@user" author attribution convention), the presence of mentions, URL's or links, or hashtags in the post, the ratio of number of alphabetical letters to total number of characters, the ratio of number of (numerical) digits to total number of characters, the fraction of words starting with capital letters, the fraction of misspelled words, the ratio of hashtags to non-hashtags in the post, etc.

At block 640, all links contained in the retained posts are normalized. Normalization refers to the process of modifying and standardizing online addresses such as URL's or URL's in a consistent manner, e.g., such that syntactically different URL's linking to the same online content are normalized to a single, standard URL. For example, a plurality of abbreviated URL's may all link to the same online content, and normalizing such plurality of URL's would generate a single normalized URL linking to that content.

At block 650, link shingles and/or other document similarity metrics are computed for all online content referred to by the normalized links. Link shingles may refer to any functions that generate a score specifying the degree of similarity between two distinct documents. For example, the content corresponding to news web page 200 shown in FIG. 2 may be stored at multiple locations on the Internet, e.g., be uploaded by different entities to different Web domains, and hence normalized links to web page 200 may nevertheless point to other URL's besides the URL 205 illustratively shown. In such cases, computing link shingles and/or other document similarity metrics may identify such distinct instances of news web page 200 as nevertheless corresponding to the same content. It will be appreciated that link shingles and/or other similarity metrics may be based on, e.g., the identification and comparison of common text, images, formatting, etc., present in separate documents.

At block 660, the set of all normalized links to online content adjudged to be sufficiently similar, e.g., by the computations at block 650, are aggregated.

At block 670, any content is discarded if it has fewer than a minimum number of adopters. The content preserved following block 670 may accordingly be classified as quality content. In alternative exemplary embodiments, any other criteria or constraints may be utilized to discard content at block 670. For example, techniques for detecting spam and/or other business rules may be utilized. Other techniques to identify content as "quality" content may include freshness of the content (e.g., how recently it was updated), if it is coming from a popular source or trusted web site, the maximum or average authority of the adopters who shared the content, etc. All of these parameters can be combined with other parameters not explicitly mentioned herein to derive a single numerical score, which can then be used to identify quality content.

Note any or all of blocks 620-670 may be modified or omitted when assessing the quality of online content. For example, in alternative exemplary embodiments (not shown), block 630 may be omitted, or block 620 may be replaced with other operations for qualifying content quality, etc. Such alternative exemplary embodiments are contemplated to be within the scope of the present disclosure.

Figure 7:
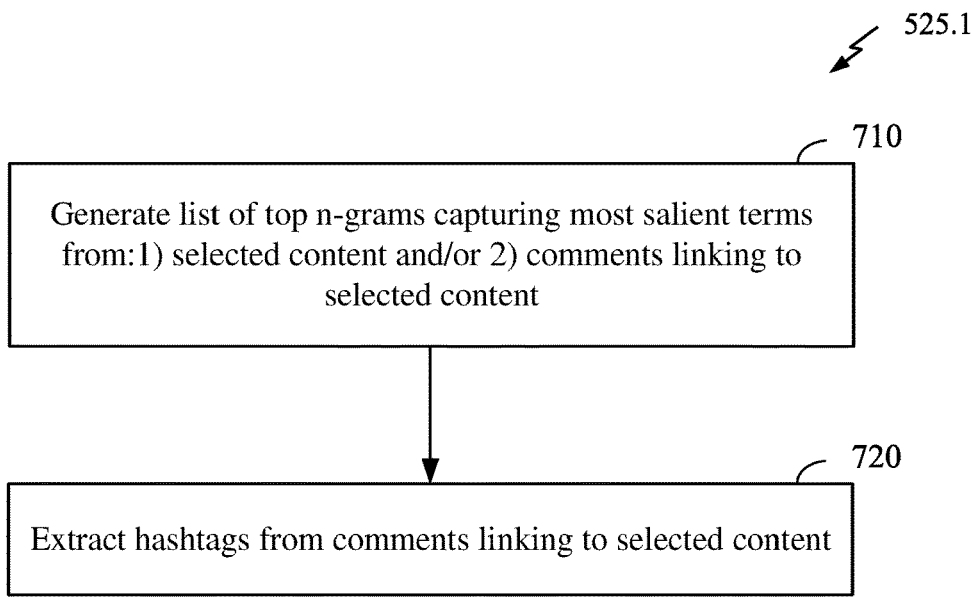
FIG. 7 illustrates an exemplary embodiment of block 525 for generating a social signature for selected content.

FIG. 7 illustrates an exemplary embodiment 525.1 of block 525 for generating a social signature for selected content. Note FIG. 7 is shown for illustrative purposes only, and is not meant to limit the scope of the present disclosure to any particular techniques for generating social signatures.

In FIG. 7, at block 710, an algorithm generates a list of top n-grams or distinct words capturing the most salient terms describing the item of selected content. Note the algorithm may be applied to two distinct sources: 1) the selected content itself (e.g., news article 200), and/or 2) comments from posts linking to the selected content, e.g., as aggregated at block 520 of method 500.

Various techniques for extracting a social signature from documents and comments may generally be applied. For example, raw text may be processed to eliminate predetermined stop words, and rule-based techniques may be applied to eliminate, e.g., emoticons, slang, profanity, spam, etc., from consideration. Furthermore, parameters such as term frequency-inverse document frequency (tf-idf), local affinity, and global affinity may be computed for extracted n-grams to generate a social signature that accurately captures and describes the online content. Alternative techniques for associating a social signature with an item of content may readily be derived, and such alternative exemplary embodiments are contemplated to be within the scope of the present disclosure.

At block 720, hashtags may further be extracted from such comments. As earlier described, a hashtag is generally marked by a "#" symbol followed by a descriptive text string. Thus block 720 may include directly extracting such strings from comments linking to the selected content. Salient hashtags can also be extracted using similar techniques as for n-grams. Note not all hashtags present in comments need to be extracted in this manner.

Figure 8:
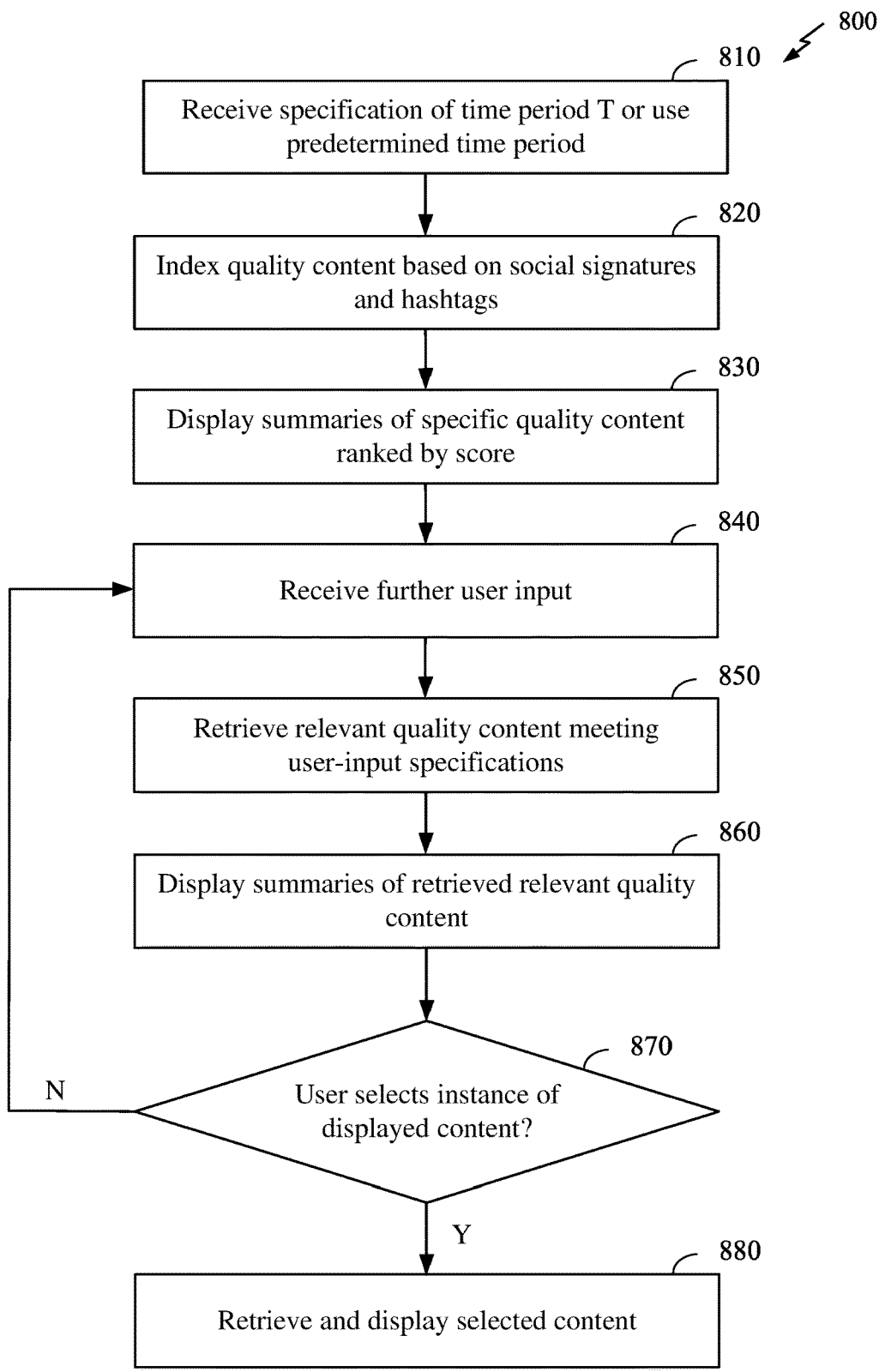
FIG. 8 illustrates an exemplary embodiment of a method for retrieving and displaying online content according to the present disclosure.

FIG. 8 illustrates an exemplary embodiment of a method 800 for retrieving and displaying online content according to the present disclosure. Note FIG. 8 is shown for illustrative purposes only, and is not meant to limit the scope of the present disclosure. Various modifications and refinements to the blocks described are derivable in view of the present disclosure. Such alternative exemplary embodiments are contemplated to be within the scope of the present disclosure.

At block 810, the specification of a time period T is received. In an exemplary embodiment, the time period T may be received from a user interface of the awareness engine, e.g., directly from the user. For example, the user may choose a specific date, and the engine may automatically set the time period T to correspond to one month, or any other time duration, immediately preceding the specified date. Alternatively, the user may explicitly specify the desired date range, e.g., start and stop dates. In yet an alternative exemplary embodiment, the time period may be set to a default or predetermined value by the system, e.g., the month preceding the current date, in the absence of user input.

At block 820, indexed quality content is identified over the specified time period T. The quality content may be provided with associated social signatures and scores (e.g., vitality, popularity, and/or other scores), and may correspond to, e.g., index 500a as generated according to the techniques described hereinabove with reference to FIG. 5.

At block 830, summaries of specific quality content are displayed. In an exemplary embodiment, the order of quality content may be ranked by score, e.g., vitality score as calculated at block 550 of FIG. 5. For example, the specific items having the top N virality scores over the selected time period T may be displayed, wherein N is a predetermined number. In an exemplary embodiment, summaries of any given content may be generated, e.g., by forming a "snippet" from relevant terms identified in the content.

In an alternative exemplary embodiment, popularity and virality may be used together, e.g., by interleaving the top popular and top viral results, or by training a ranker that uses both virality and popularity as separate signals to generate an overall ranking. Other signals may also be accommodated by such a ranker besides virality and popularity, e.g., freshness of online content, the identity of the web site domain (e.g., a recognized national news media outlet website may be weighted more heavily than a personal blog website), the type of results (news article vs. blog post), etc. Such alternative exemplary embodiments are contemplated to be within the scope of the present disclosure.

At block 840, further user input is received regarding how to proceed with the query processing. In an exemplary embodiment, such user input may include, e.g., specification of one or more search terms as part of a search query, and/or specification of a different time period T for additional search.

At block 850, quality content relevant to the user-input specifications at block 840 are identified and retrieved. In particular, blocks 505-550 of method 500 may earlier have been performed to generate indexed quality content 500a. Alternatively, if a different time period T was specified by the user at block 840, then blocks 505-550 of method may be performed again.

From indexed quality content 500a, a subset (also denoted "relevant content" herein) may be identified as being relevant to a search query specified at block 840. In an exemplary embodiment, an item may be deemed relevant to a search query if the query text corresponds to some portion of the social signature associated with the content. For example, assuming the selected time period matches and other quality criteria are met, then news web page 200 may be identified as relevant to a search query for "baby seals," since "baby seals" is part of the social signature computed for exemplary web page 200.

In alternative exemplary embodiments, a search query can be matched with relevant online content using techniques other than direct text matching of query with social signature. For example, mechanisms employed by general online search engines to match query text to relevant online content may also be utilized. For example, the social signature may be matched not only with explicit terms in the query, but also with synonyms of explicit terms in the query, and/or also other spelling/grammatical variants, etc., of the explicit terms.

In an exemplary embodiment, queries may be matched with those found in current news query registers as may be used by general online search engines. For example, a news query register may be maintained to track certain fields, e.g., titles headlines), summaries (or "snippets"), and keywords present in news articles collected from a predetermined list of news sources. In an exemplary embodiment, quality content (such as identified at block 510 of FIG. 5) may be further indexed based on whether they are relevant to fields in the news query register. Accordingly, when a search query contains explicit terms matching such fields in the news query register, corresponding quality content may be retrieved. Alternatively, the matching of a search query term with a field in the news query register may be one of a plurality of inputs deciding what content is to be retrieved, with other inputs including, e.g., exact match of a query term with content social signature, etc. Such alternative exemplary embodiments are contemplated to be within the scope of the present disclosure.

In an exemplary embodiment, query text may contain "temporal patterns," e.g., text indicating a specific time period of interest to the user. Such temporal patterns may be extracted from the query, and used in conjunction with, or to the exclusion of, date index button 930 (as further described hereinbelow with reference to FIG. 9) in setting the time period T, at block 505. Alternatively, in some cases, temporal patterns need not be extracted and assigned a separate significance as specifying the time period T, and may be considered as part of the overall search query. For example, the query "6/26 memorial" may be interpreted as containing the temporal pattern "6/26" (or June 26), or it may be interpreted as a complete text string "6/26 memorial" that may perhaps coincide with the name of an actual entity (e.g., venue or performance) named "6/26 memorial." Such alternative exemplary embodiments are contemplated to be within the scope of the present disclosure.

Other techniques for matching query text with quality content include triggering for contextual vectors (such as popular keywords used by the hashtag mentioned alongside the content), for hashtags used when sharing the content, and for keywords and meta tags specified on the website URL. Furthermore, a query containing a username could also return content shared by any user by that username. Such alternative exemplary embodiments are contemplated to be within the scope of the present disclosure.

In an exemplary embodiment, a contextual vector is a list of n-grams (keywords) associated with a hashtag. The contextual vector is temporally sensitive, e.g., the context is valid at the anchor point of the hashtag along a timeline. For example, for the case of #charliehebdo, having anchor point of Feb. 7, 2015, the contextual vector may be: #charliehebdo->free speech, charlie hebdo, terrorist attack, terror attack, satirical magazine, sad day, paris attack. Also, at the same anchor point of Feb. 7, 2015, a related hashtag may have a contextual vector as follows: #jesuischarlie->charlie hebdo, free speech, trafalgar square, sad day, terrorist attack, terror attack, french people, paris attack. The similarity of these two contextual vectors may be used to surmise that the hashtags #charliehebdo and #jesuischarlie are related to each other. Given this information, the relationships between the keywords and hashtags may be used to identify content or links relevant to a particular search query.

Further note that in many instances, it may be assumed that a hashtag is a proxy for a topic. For example, if the hashtag is #charliehebdo, the topic is the Charlie Hebdo terrorist attack, and thus this relationship may also be utilized to identify content or links relevant to a particular search query.

In an exemplary embodiment, similar queries/ngrams may be clustered to further augment the triggering mechanisms. For example, to each distinct social signature, contextual vector, query rewriting n-gram, title/snippet/article n-gram, etc., can be assigned a group of closely related keywords/queries, representing varying descriptions of a single topic or theme.

In an exemplary embodiment, relevant content may be ranked solely by associated virality scores. In an alternative exemplary embodiment, virality score may be combined with popularity, or other scores to further refine each item's rank. For example, a web page having the highest virality score may not necessarily be the most relevant to a search query, if another web page (having lower virality score) has a social signature that more closely matches the search query. It will be appreciated that techniques for determining relevance of online content to a search query may generally be applied, and exemplary embodiments incorporating any such techniques are contemplated to be within the scope of the present disclosure.

At block 860, summaries of relevant content identified at block 850 may be retrieved and displayed.

At block 870, it is determined whether the user selects an item displayed at block 860. If no, then method 800 returns to block 840 to receive further user input, e.g., another search query. If yes, then method 800 proceeds to block 880.

At block 880, the content selected by the user is retrieved and displayed.

Figure 9:
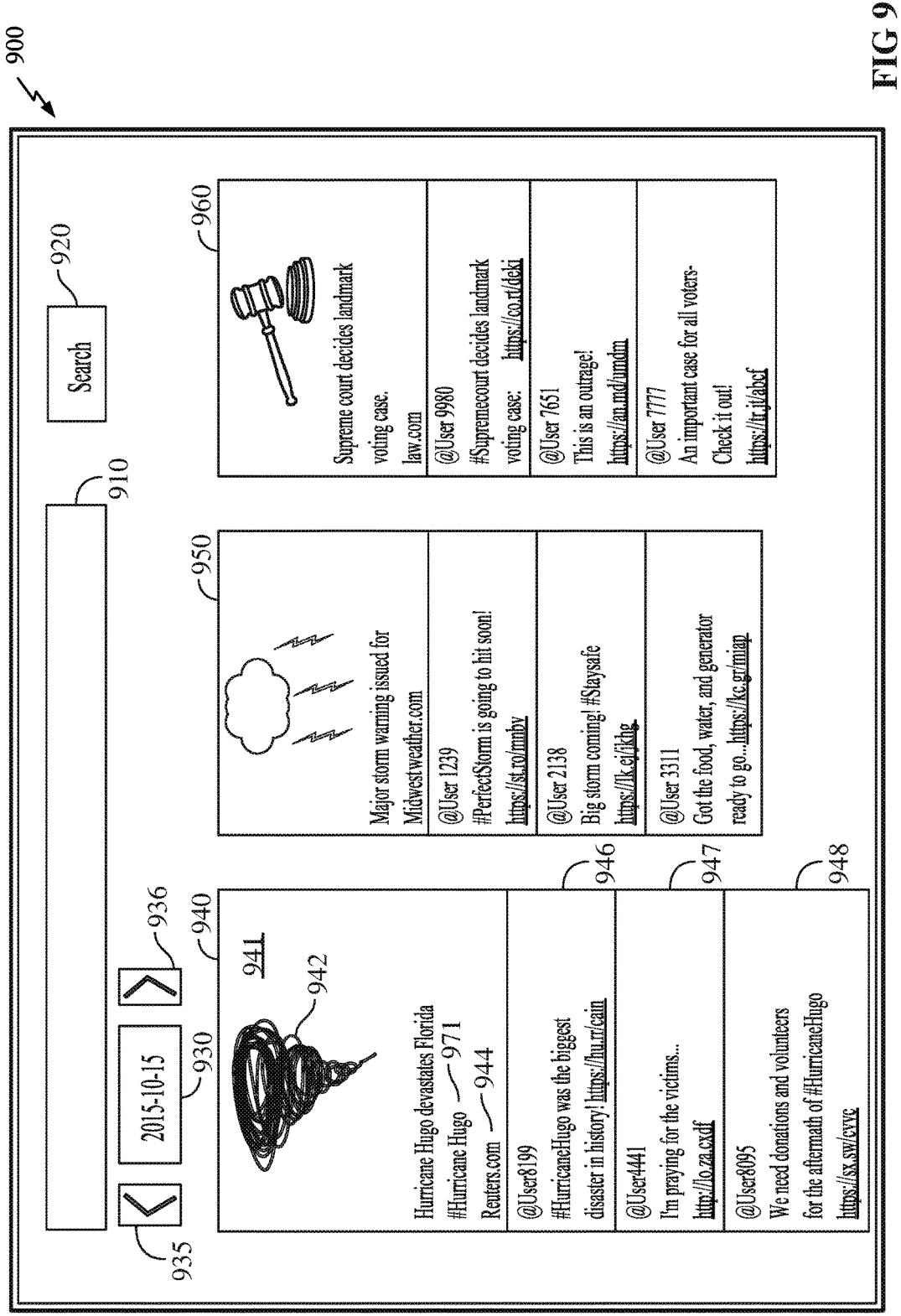
FIG. 9 illustrates an exemplary embodiment of a user interface for an awareness engine according to the present disclosure.

FIG. 9 illustrates an exemplary embodiment of a user interface 900 for an awareness engine according to the present disclosure. It will be appreciated that FIG. 9 is shown for illustrative purposes only, and is not meant to limit the scope of the present disclosure to any specific formats or user interfaces shown.

In an exemplary embodiment of an awareness engine, when users navigate to a landing page of the search engine, then user interface 900 of the engine may be displayed through a web browser. User interface 900 may include a search bar 910, wherein users may search for specific online content using keywords, hashtags, etc. In FIG. 9, search bar 910 is blank, corresponding to a state of user interface 900 before the user has typed in a search query. Users may confirm the search query, e.g., by clicking the search button 920 or pressing enter on the keyboard.

User interface 900 further allows searching for online content by date, using date index button 930. In particular, according to this option, online content having the highest scores for the selected date range may be displayed. In an exemplary embodiment, the date displayed on button 930 may refer to the most recent date in the desired date range, e.g., a two-week period preceding the date shown. The specific period may be chosen by default, or it may be selected by the users using controls not shown in FIG. 9. Date selection may further be performed using back button 935 or forward button 936 to change the selected date.

Further shown in user interface 900 is a plurality of "cards" 940, 950, and 960, corresponding to specific summaries of online content. Note in the absence of a user search query, e.g., upon the user first navigating to the landing page of the awareness engine, each card shown may display information relevant to currently popularly discussed or viral topics, e.g., as ranked by virality, popularity, or other score. Note for a mobile phone or other mobile device wherein display size is limited, the layout of user interface 900 may be appropriately modified for readability. For example, the plurality of cards may alternatively be arranged vertically for ease of scrolling, etc.

Each of the displayed cards may show summaries of the online content as well as other relevant information. For example, card 940 may contain a summary portion 941 displaying an image 942 associated with the online content, as well as text description 944. Underneath text description 944, card 940 may further display popular and/or viral user posts 946, 947, and 948 that link to the online content.

Various fields of card 940 may be clicked by the user to retrieve additional relevant information. For example, clicking on summary portion 941 may directly retrieve the online content for display. Furthermore, clicking on any of the posts 946, 947, 948 may enable access to the profile page associated with that specific post. Users may also click on any hashtags such as 971, 972, 973, to further perform a search of online content based on that hashtag. In an exemplary embodiment, clicking on any field of card 940 may bring up a graphic visualization of the diffusion tree for the corresponding online content.

Figure 10:
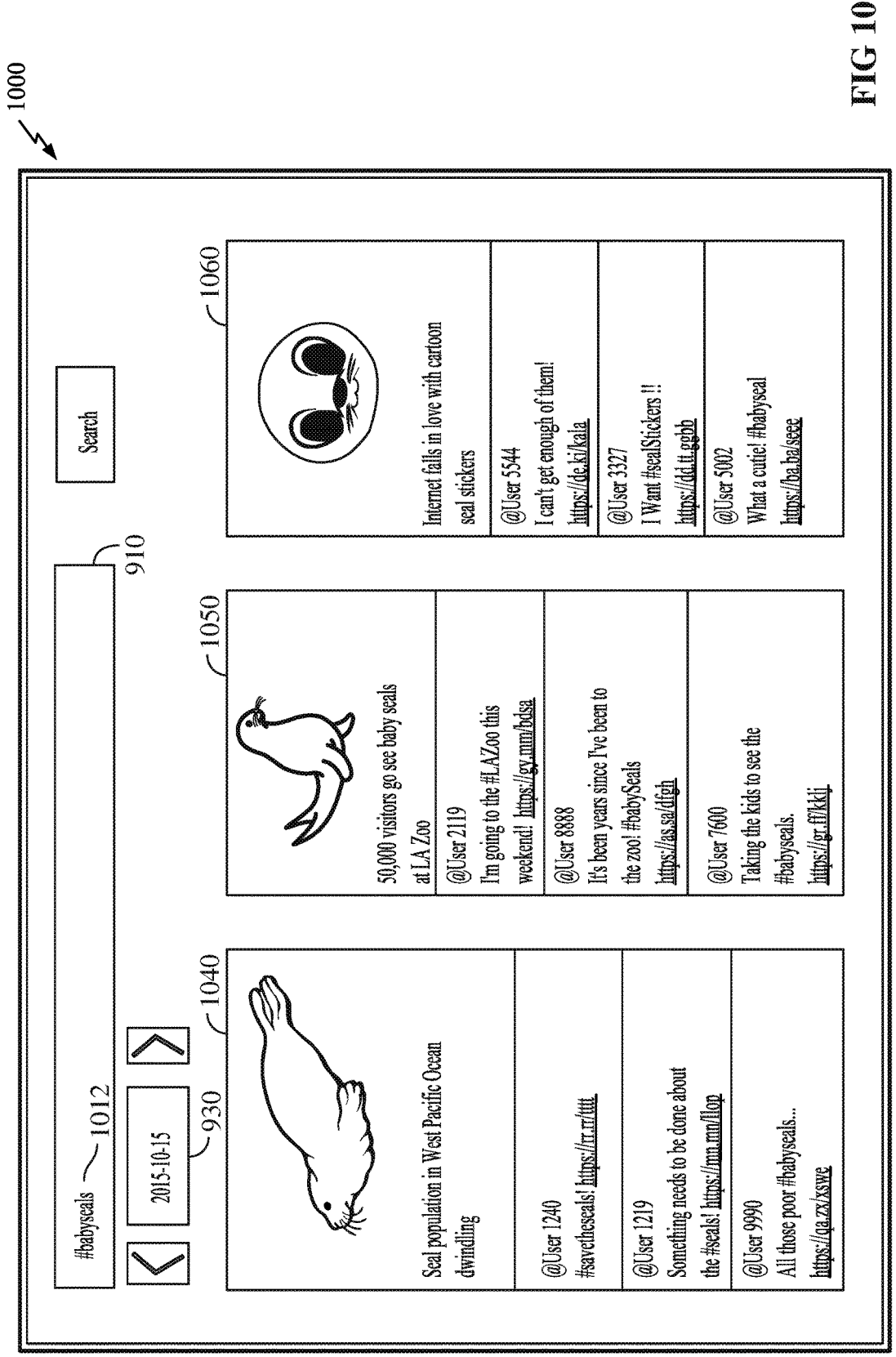
FIG. 10 illustrates an exemplary embodiment of a user interface, after a user has entered a specific search query in search bar.

FIG. 10 illustrates an exemplary embodiment of a user interface 1000, after a user has entered a specific search query in search bar 910. Note the layout of user interface 1000 may be similar to that of user interface 900 in FIG. 9, and description of similar elements may be omitted.

In FIG. 10, the user enters a specific search query, in this instance, the hashtag "#babyseals" 1012, in search bar 910. A plurality of cards 1040, 1050, 1060 relevant to the search query is retrieved and displayed in response to the user query. In an exemplary embodiment, changing the selected date shown at date index button 930 may return different results for the same query. For example, changing the date shown in FIG. 10 of "2015-10-15" to an earlier date of "2013-10-15" may bring up cards corresponding to online content relevant to "#babyseals" having the highest scores at that time.

FIG. 11 illustrates an alternative exemplary embodiment of a user interface 1100 for an awareness engine. It will be appreciated that FIG. 11 is shown for illustrative purposes only, and is not meant to limit the scope of the present disclosure. In FIG. 1I, next to cards 940, 950 may be displayed a top results box 1160, showing popular hashtags 1162 and keywords 1164, corresponding to the content having the highest ranked scores for the specified date.

In an exemplary embodiment, user interface 1100 may be directly provided on the landing page of the search engine. In an alternative exemplary embodiment, the user may access user interface 1100 by clicking on a link (not shown in FIG. 9) in user interface 900.

Figure 12:
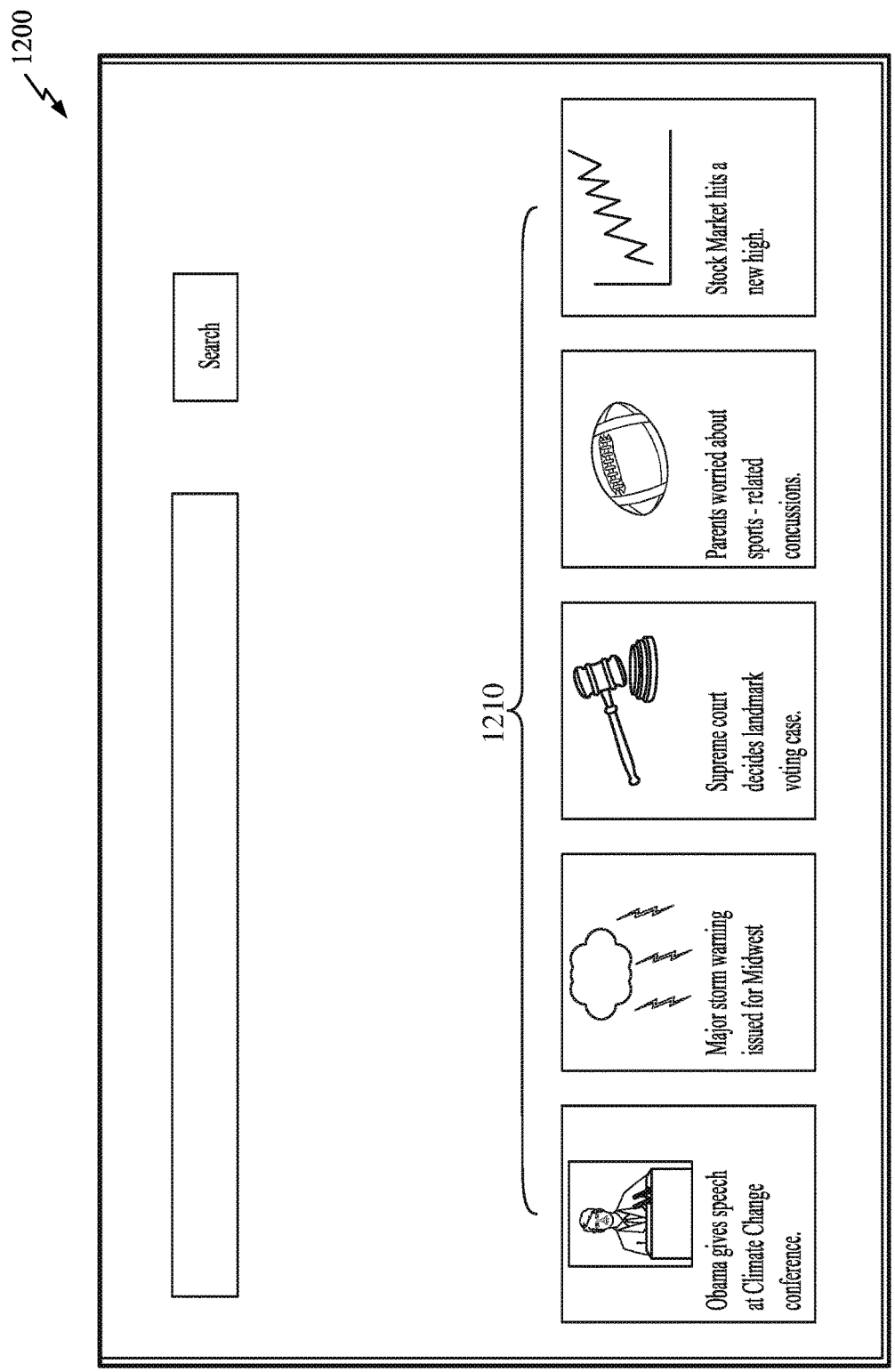
FIG. 12 illustrates an alternative exemplary embodiment of a user interface for a general search engine incorporating techniques of the present disclosure.

FIG. 12 illustrates an alternative exemplary embodiment of a user interface 1200 for a general search engine incorporating techniques of the present disclosure. It will be appreciated that FIG. 11 is shown for illustrative purposes only, and is not meant to limit the scope of the present disclosure. In particular, the summary portions of a plurality of cards 1220, 1230, 1240, etc. may be displayed in a "carousel" format at the bottom 1210 of user interface 1200, for easy access by the user of the general search engine. The plurality of cards may refer to online content having the highest scores over a default time period, e.g., the previous one month. Users may click on information displayed in cards 1220, 1230, 1240, etc. to access the corresponding online content.

Note user interface 1200 may be for a general relevance search engine, i.e., an engine that retrieves results based on web page relevance, notwithstanding the fact that the plurality of cards 1210 may correspond to viral content identified and ranked according to the techniques of the present disclosure.

Figure 13:
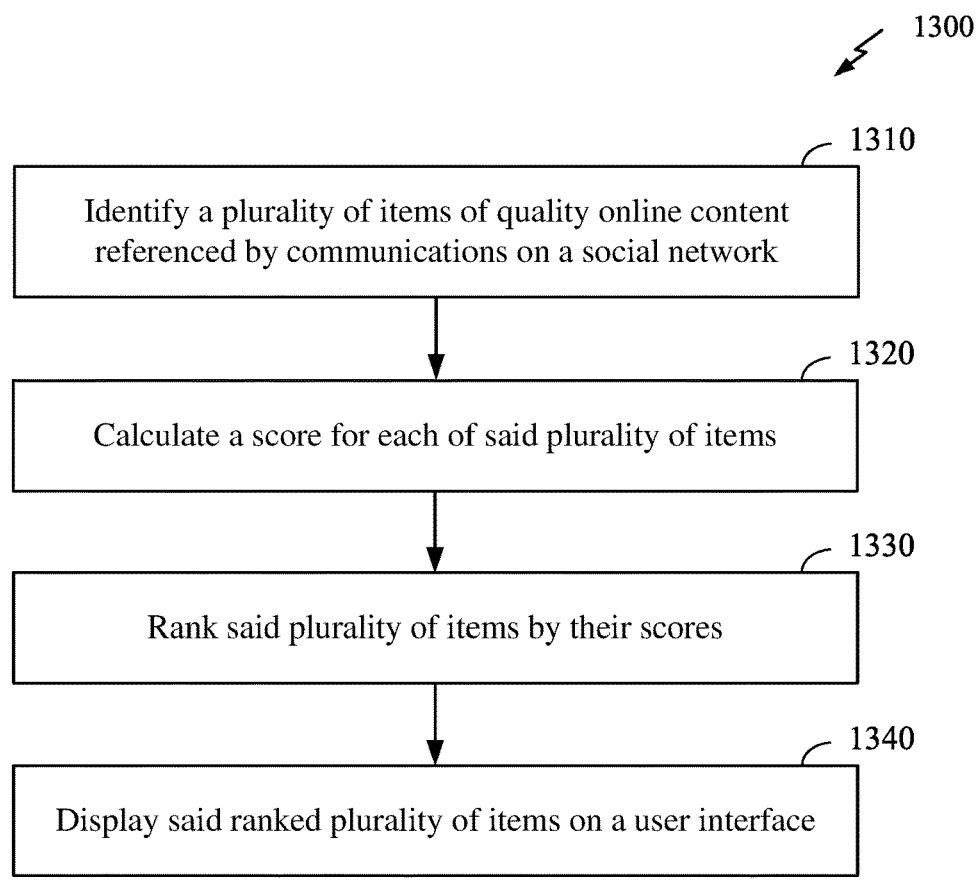
FIG. 13 illustrates an exemplary embodiment of a method according to the present disclosure.

FIG. 13 illustrates an exemplary embodiment of a method 1300 according to the present disclosure. Note FIG. 13 is shown for illustrative purposes only, and is not meant to limit the scope of the present disclosure to any particular method shown.

In FIG. 13, at block 1310, a plurality of items of quality online content referenced by communications on a social network is identified. In an exemplary embodiment, the quality online content may meet a predetermined quality threshold.

At block 1320, a score is calculated for each of said plurality of items, the score comprising a measure of virality of each item.

At block 1330, said plurality of items are ranked by their scores.

At block 1340, said ranked plurality of items are displayed on a user interface.

Figure 14:
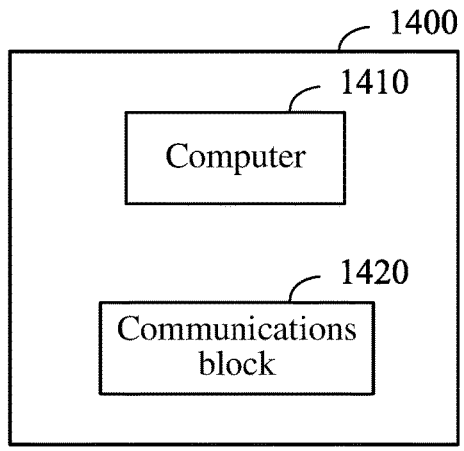
FIG. 14 illustrates an exemplary embodiment of an apparatus according to the present disclosure.

FIG. 14 illustrates an exemplary embodiment of an apparatus 1400 according to the present disclosure. Note FIG. 14 is shown for illustrative purposes only, and is not meant to limit the scope of the present disclosure to any particular apparatus shown.

In FIG. 14, apparatus 1400 comprises a computer 1410 configured to identify quality online content referenced by communications on a social network, and calculating a score for each item of identified quality online content, the score comprising a measure of virality of each item, the computer 1410 further configured to rank a plurality of said items by their scores. Apparatus 1400 further comprises a communications block 1420 configured to transmit said ranked plurality of items to a user terminal for display.

Figure 15:
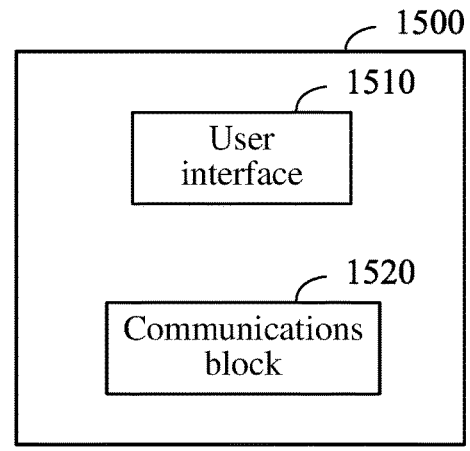
FIG. 15 illustrates an alternative exemplary embodiment of an apparatus according to the present disclosure.

FIG. 15 illustrates an alternative exemplary embodiment of an apparatus 1500 according to the present disclosure. Note FIG. 15 is shown for illustrative purposes only, and is not meant to limit the scope of the present disclosure to any particular apparatus shown.

In FIG. 15, apparatus 1500 comprises a user interface 1510 configured to receive a user query, and a communications block 1520 configured to transmit the user query to a remote terminal, and to receive from said remote terminal a plurality of items of identified quality online content ranked by score, the score comprising a measure of virality of each of the plurality of items. The user interface 1510 is further configured to display the received plurality of items.

Figure 16:
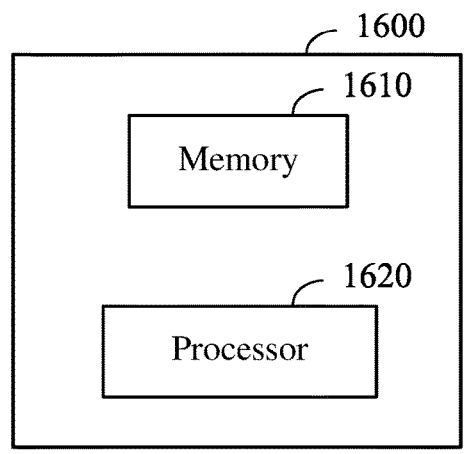
FIG. 16 illustrates an exemplary embodiment of a computing device according to the present disclosure.

FIG. 16 illustrates an exemplary embodiment of a computing device 1600 including a memory 1610 holding instructions executable by a processor 1620 to: identify a plurality of items of quality online content referenced by communications on a social network; calculate a score for each of said plurality of items, the score comprising a measure of virality of each item; rank said plurality of items are ranked by their scores; and display said ranked plurality of items on a user interface.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intentions to cover all modifications, alternative constructions, and equivalents falling within the spirit and scope of the invention.

The invention claimed is:

1. A method comprising:
   identifying a plurality of items of quality online content referenced by communications on a social network, said quality online content meeting a predetermined quality threshold;
   calculating a score for each of said plurality of items, the score comprising a virality score of each item;
   ranking said plurality of items by their scores; and
   displaying said ranked plurality of items on a user interface;
   the calculating the score comprising:
   for each item of quality online content, identifying an adopter of said item;
   constructing at least one diffusion tree from all identified adopters of said item; and
   calculating the virality score based on the constructed at least one diffusion tree.

2. The method of claim 1, the identifying the quality online content comprising:
   aggregating communications linking to similar online content over a selected time period from adopters on the social network having a minimum number of followers.

3. The method of claim 2, said communications linking to similar online content comprising communications containing normalized online addresses linking to similar online content as adjudged by link shingles computations.

4. The method of claim 2, the selected time period being specified as part of a user query.

5. The method of claim 1, the calculating the virality score comprising calculating the average pairwise distance between all pairs of adopters in all diffusion trees constructed for said item of quality online content.

6. The method of claim 1, further comprising:
   generating a social signature for each item of quality online content; and
   receiving a user query;
   said ranking said plurality of said items comprising ranking a plurality of items of the quality online content having a social signature containing at least a portion of the user query.

7. The method of claim 6, the generating the social signature comprising:
   generating a list of top n-grams capturing salient terms from the item of quality online content;
   generating a list of top n-grams capturing salient terms from communications linking to said item of quality online content; and
   extracting hashtags from communications linking to said item of quality online content.

8. The method of claim 1, the communications on the social network comprising posts on profiles by users of the social network.

9. The method of claim 1, the communications on the social network comprising emails sent by users to one or more recipients.

10. The method of claim 1, the score further comprising a measure of popularity of each item.

11. An apparatus comprising:
    a computer configured to identify quality online content referenced by communications on a social network, and calculate a score for each item of identified quality online content, the score comprising a virality score of each item, the computer further configured to rank a plurality of said items by their scores; and
    a communications block configured to transmit said ranked plurality of items to a user terminal for display;
    the computer configured to calculate the score by: for each item of quality online content, identifying an adopter of said item; constructing at least one diffusion tree from all identified adopters of said item and calculating the virality score based on the constructed at least one diffusion tree.

12. The apparatus of claim 11, the computer configured to identify the quality online content by aggregating communications linking to similar online content over a selected time period from adopters on the social network having a minimum number of followers.

13. The apparatus of claim 12, said communications linking to similar online content comprising communications containing normalized online addresses linking to similar online content as adjudged by link shingles computations.

14. The apparatus of claim 12, the selected time period being specified as part of a user query.

15. The apparatus of claim 11, the computer configured to calculate the virality score by calculating the average pairwise distance between all pairs of adopters in all diffusion trees constructed for said item of quality online content.

16. The apparatus of claim 11, the computer further: generating a social signature for each item of quality online content; receiving a user query; and ranking a plurality of items of the quality online content having a social signature containing at least a portion of the user query.

17. An apparatus comprising:
    a user interface configured to receive a user query; and
    a communications block configured to transmit the user query to a remote terminal, and to receive from said remote terminal a plurality of items of identified quality online content ranked by score, the score comprising a virality score of each of the plurality of items;

the user interface further configured to display the received plurality of items;

wherein, for each item of quality online content, the virality score is calculated by: identifying an adopter of said item; constructing at least one diffusion tree from all identified adopters of said item; and calculating the virality score based on the constructed at least one diffusion tree.

18. The apparatus of claim 17, the user interface further receiving a specification of time period with the user query, the communications block transmitting the time period to the remote terminal;

the user interface further receiving a selection of one of the displayed plurality of items, the communications block further transmitting said selection and receiving from the remote terminal content corresponding to said selection.

* * * * *